(12) United States Patent
Harkin (10) Patent No.: US 6,411,727 B1
(45) Date of Patent: Jun. 25, 2002

(54) FINGERPRINT SENSING DEVICES AND SYSTEMS INCORPORATING SUCH

(75) Inventor: Gerard F. Harkin, Brighton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/257,676

(22) Filed: Feb. 25, 1999

(30) Foreign Application Priority Data

Feb. 5, 1998 (GB) .............................................. 9804539

(51) Int. Cl.[7] ................................................. G06K 9/00
(52) U.S. Cl. ...................................... 382/124; 340/5.83
(58) Field of Search ................................ 382/115, 124, 382/125; 235/380, 492; 704/246, 273; 902/3, 4, 25; 283/68; 356/71; 705/1, 26, 42; 340/5.82, 5.83, 5.3, 5.31, 5.52, 5.53

(56) References Cited

U.S. PATENT DOCUMENTS 5,142,346 A * 8/1992 Hynecek ..................... 257/258
5,325,442 A 6/1994 Knapp ......................... 382/124

FOREIGN PATENT DOCUMENTS

WO            9740744 A1    11/1997

\* cited by examiner

*Primary Examiner*—Samir Ahmed (57) ABSTRACT

A fingerprint sensing device comprises an array of capacitive type sense elements (12) each having a sense electrode (14) for forming, together with an overlying fingerprint portion, a capacitance and a transistor (16) connected between the sense electrode and first and second associated address conductors (18, 20). The transistor is arranged with its gate connected to the sense electrode such that, due to the effect of the capacitance and parasitic capacitances in the transistor, a selection signal applied to the first conductor (18) causes the transistor to be turned on or to be held off in the presence of a fingerprint valley or ridge overlying the sense electrode. Fast sampling of the transistor on/off currents produced in the second conductor (20) is possible and improved noise rejection and high signal to noise ratio is obtained. A further transistor (17) may be included in the sense element which is operable to remove any unwanted charge on the gate of the first-mentioned transistor.

12 Claims, 5 Drawing Sheets

FINGERPRINT SENSING DEVICES AND SYSTEMS INCORPORATING SUCH

BACKGROUND OF THE INVENTION

The present invention relates to a fingerprint sensing device comprising an array of sense elements which each comprise a sense electrode spaced from a sensing surface over which a finger whose print is to be sensed is placed and providing in combination with an overlying fingerprint portion a capacitance, and a transistor connected between the sense electrode and first and second address conductors via which respectively the sense element is selected by means of a selection signal and an output dependent on the capacitance of the sense element is obtained. The invention relates also to a fingerprint recognition system incorporating such a device.

A fingerprint sensing device of the above kind is described in U.S. Pat. No. 5,325,442. In this device, the sense elements are arranged in a row and column array and the transistors of the sense elements, in the form of thin film transistors (TFTs), are connected via sets of row and column address conductors to a drive circuit. The gates of the TFTs of the sense elements in one row are connected to a respective, common, row conductor while the sources of the TFTs of all sense elements in one column are connected to a respective, common, column address conductor. The drain electrode of each TFT is connected to the sense electrode of the sense element. The sense electrodes together with overlying dielectric material and individual fingerprint portions constitute capacitors. The row address conductors are connected to a scan circuit which applies a gating (selection) signal to each row conductor in a respective row address period to turn on the TFTs of the sense elements of each row in sequence. Simultaneously with a gating signal a predetermined potential is applied to the column address conductors to charge the capacitors. The individual capacitances of these capacitors depend on the spacing of the fingerprint portions from the sense electrodes, as determined by the presence of a ridge or a trough of the fingerprint, and are measured by sensing the charging current flowing in the column conductors during charging of the capacitors, using current or charge sensing amplifier circuits incorporated in the drive circuit. At the end of the row address period, the TFTs are turned off and a gating signal applied to the next row conductor to turn on the TFTs of the next row of sense elements. Each row of sense elements is addressed in this manner in turn and the variation in sensed capacitances produced over the array of sense elements by a fingerprint ridge pattern provides an electronic image or representation of the three dimensional form of the fingerprint surface. Before the sense elements are addressed again the charge on the sense electrodes is removed, or at least reduced, either by incorporating a resistor in each sense element connected between the sense electrode and ground, by changing the predetermined voltage applied to column conductors in successive read cycles, or by arranging the drive circuit to include an intermediate reset cycle between successive read cycles.

A different form of sensing element is described in WO97/40744 (PHB 34068) which uses two TFTs whose gates are connected respectively to successive row address conductors. The first TFT is connected such that when it is operated by means of a gating signal applied to its associated row address conductor it serves to charge up the capacitance formed by the sense electrode and overlying fingerprint portion, the amount of charge supplied differing according to whether a ridge or valley is present over the sense electrode. The second TFT is connected between the sense electrode and the second address conductor and is operated immediately after operation of the first TFT so as to transfer any charge stored on the capacitance to the second address line where it is sensed by a sense amplifier. Faster read-outs from the array are possible with this arrangement because the need to reset the capacitances of the sense elements in a separate step is removed.

However, the sensing operation relies on the need for the capacitance to be discharged into the second address conductor through the TFT and the time needed to achieve this can be a limiting factor. The operating speed of this device is still therefore less than ideal. Such discharge can typically take tens of microseconds and if adequate time is not allowed for this some charge may remain in the sensing element's capacitance which could then affect a subsequent reading. Moreover, ac noise from a person's finger is coupled via the capacitance and the TFT to the sense amplifier where it is integrated over this relatively lengthy period of time and this can lead to the distinction between read-outs for fingerprint ridges and valleys being diminished.

SUMMARY OF THE INVENTION

It is an object of the present invention to provide a fingerprint sensing device offering improvements in these respects.

According to one aspect of the present invention a fingerprint sensing device of the kind described in the opening paragraph is characterised in that the drain and source electrodes of the transistor are connected to the first and second address conductors and the gate electrode is coupled to the sense electrode. The operating principle of the sensing elements of the present invention is very different to that of the known devices. Rather than of relying on the capacitance being discharged into the second address conductor for sensing by the sense amplifier, the sensing of a ridge or valley of a fingerprint is accomplished instead by sampling the transistor's on and off currents. The transistor is not turned on directly by means of a gating selection signal applied via an address conductor to its gate as in the known arrangements but by the effect of a person's fingerprint. The transistor is either turned on or held off depending on the presence of a ridge or valley over the sense electrode. With a selection potential applied to the first address conductor, the effect of parasitic gate source and gate drain capacitances inherent in the transistor is to couple a charge on the gate. The resulting change in gate potential is dependent on the magnitude of the capacitance formed by the sense electrode and an overlying fingerprint portion. In the case of this portion being a ridge, the capacitance is comparatively large and consequently the change in gate potential is small and of insufficient magnitude to turn on the transistor. In the case of the portion being a valley, the capacitance is comparatively small and the change in gate voltage is thus larger, and of sufficient magnitude to turn on the transistor. This results in an electrical current flowing into the second address line where it is sensed. This drain-source current can be sampled very quickly, for example within one to five microseconds, compared to the time necessary to sense transferred charge in the known device. Consequently, a much faster read-out is possible from the array. Also, because only a short integration time is needed, much better noise rejection is obtained. The ridge/valley output ratio, i.e. the ratio of the outputs obtained from a sense element in the presence of an overlying ridge and valley of a fingerprint, is a function of the off/on current ratio of the transistor which can be many orders of magnitude, thus providing a high contrast ratio and a high signal to noise ratio.

The inherent gate/source and gate/drain parasitic capacitances of the transistor may be deliberately increased so as to ensure, and actively assist, the intended sense element operation. To this end, the gate of the transistor may be formed as an extended area of conductive material, such as a metal, covering the source and drain electrodes as well as the channel region and may serve to provide also the sense electrode.

It will be appreciated that reference to the source and drain electrodes of the transistors can be interchangeable.

As in the known devices, the sense elements are preferably arranged in rows and columns and connected to sets of first and second address conductors extending in the row and column directions with the transistors of the sense elements in a row being connected to a common address conductor of the first set and with the transistors of the sense elements in a column being connected to a common address conductor of the second set. In this case, a drive circuit connected to the sets of address conductors may conveniently be arranged to supply a selection signal to each of the address conductors of the first set in sequence so as to operate the sensing elements on a row by row basis.

In order to avoid the possibility of the gate of the transistor floating either high or low due to a build up of static electricity on a person's finger which could affect the desired operation of the sense element, each sense element preferably further includes a further switching device, preferably another transistor, which is connected to the gate of the first-mentioned transistor and operable periodically to set the potential of the gate to a predetermined level, preferably virtual earth. In the case of the switching device comprising a further transistor, then preferably the drain and source electrodes of this transistor are connected between the gate of the first mentioned transistor and the address conductor of the first set to which the first-mentioned transistor is connected and its gate connected to another address conductor of the first set different to that to which the first-mentioned transistor is connected. Thus, when a selection signal is applied to that different address conductor so as to select and operate the sense elements associated with that address conductor, the selection signal serves also to turn on the further transistors of a non-selected row of sense elements so as to set the gate potential of the first mentioned transistors of the non-selected row. Alternatively, the drain and source electrodes could be connected between the gate of the first-mentioned transistor and the second address conductor. In this case, however, any charge is transferred to the second address conductor which may be less desirable. In another alternative arrangement, the further transistor in each sense element may be arranged with its source and drain electrodes connected between the other address conductor of the first set and the gate of the first-mentioned transistor and with its gate connected to the second address conductor. With this arrangement the gates of the first-mentioned transistors in a column of sense elements can be reset by means of a gating signal applied to the second address conductor and any charge present on the gates is prevented from passing to the second address conductor.

Desirably, the gate/source and gate/drain parasitic capacitance values of the further transistor are small compared with those of the first-mentioned transistor, which can be achieved through appropriate design, for example using known self-alignment techniques, so as not to have an undue effect on the operation of first-mentioned transistor.

Instead of using a further transistor in the sense element, problems due to static-electricity on a person's finger could instead be avoided by providing grounded conductors on the sensing surface, for example in the form of a grid extending in spaces between row and columns of sensing elements in the array.

In a preferred embodiment, the transistors of the array of sense elements comprise thin film transistors (TFTs) which, together with the sets of address conductors and the sense element electrodes, are carried on an insulating support, for example of polymer material or glass. The TFTs may comprise amorphous silicon devices. Preferably though, the TFTs comprise polysilicon TFTs. For convenience, the drive circuit is preferably integrated on the same support and fabricated simultaneously with the sense element TFTs and the sets of address conductors and this is readily possible using polysilicon technology. Inexpensive and compact sensing devices are then obtained which are ideally suited to, for example, integration in smart cards and the like.

The sensing device may instead be fabricated as an integrated circuit using a semiconductor wafer.

According to another aspect of the present invention there is provided a fingerprint recognition system comprising a sensing device in accordance with the one aspect of the invention, means responsive to the output from the sense means of the device to provide characteristical data of a sensed fingerprint, and means for comparing said characteristical data with stored characteristical data for one or more fingerprints.

BRIEF DESCRIPTION OF THE DRAWING

Embodiments of fingerprint sensing devices, and a fingerprint recognition system incorporating such, in accordance with the invention will now be described, by way of example, with reference to the accompanying drawings, in which.

It is to be understood that the Figures are merely schematic and are not drawn to scale. Certain dimensions may have been exaggerated while others have been reduced. The same reference numbers are used throughout the Figures to indicate the same, or similar, parts.

DESCRIPTION OF THE PREFERRED EMBODIMENTS

Figure 1:
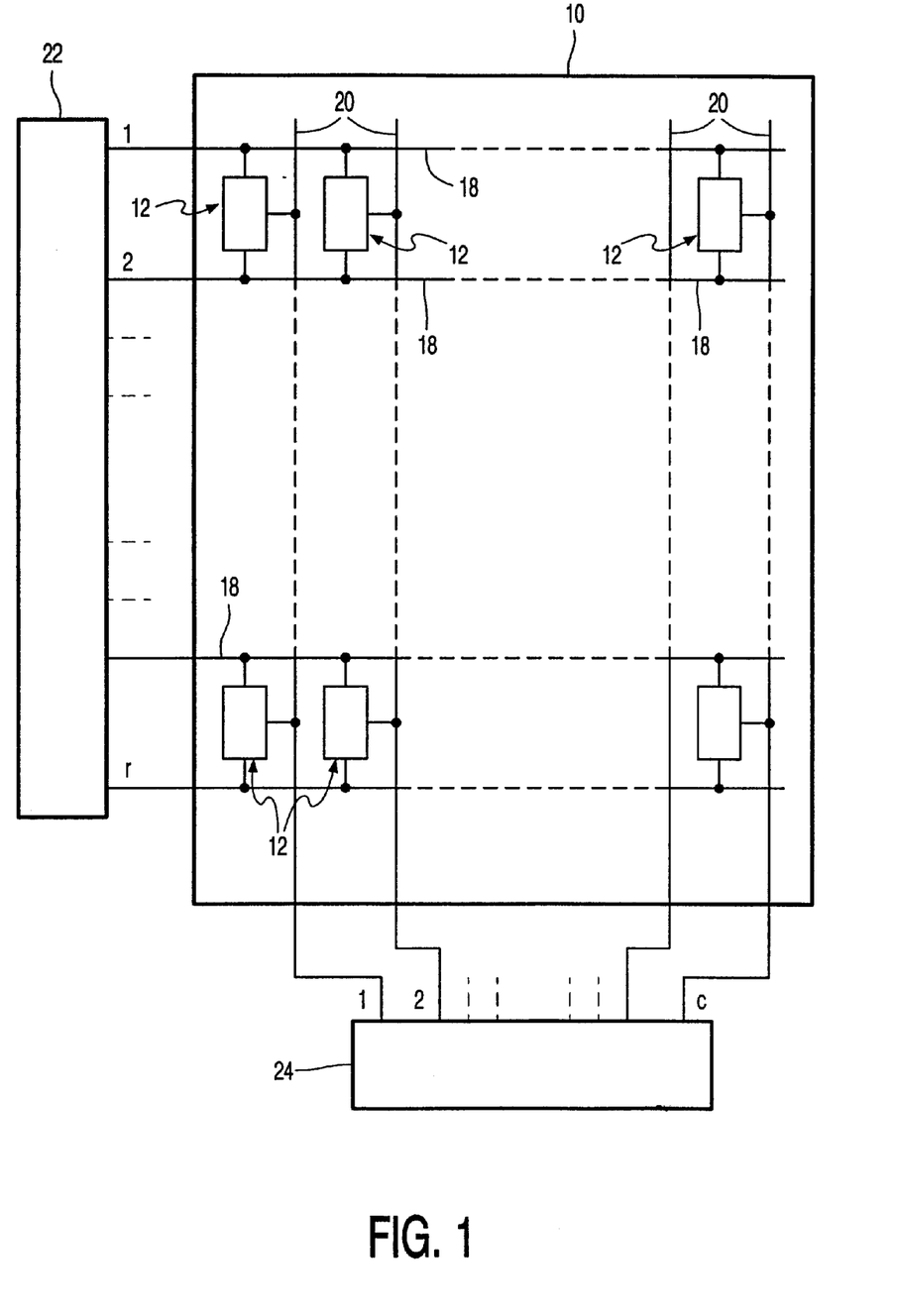
FIG. 1 is a simplified diagram of an embodiment of the sensing device showing an array of sense elements together with associated addressing circuitry.

Referring to FIG. 1, the fingerprint sensing device comprises an active matrix addressed sensing pad 10 having an X-Y array of regularly-spaced sense elements 12, consisting of r rows each with c sense elements, which are operable to scan a fingerprint. Only a few rows and columns are shown for simplicity. In practice there may be around 512 rows and 512 columns of sense elements occupying an area of approximately 2.5 cms by 2.5 cms.

Figure 2:
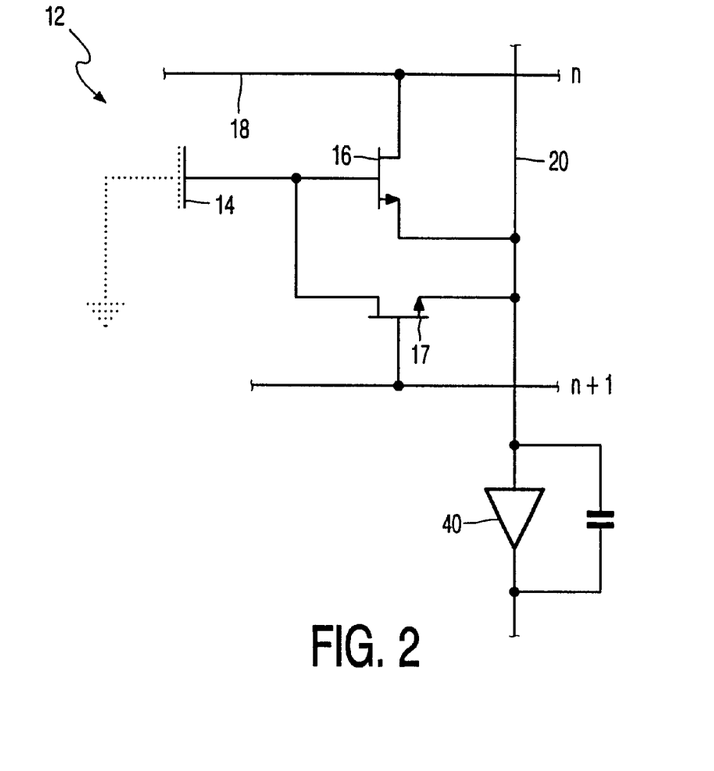
FIG. 2 shows the equivalent circuit of a typical sense element in the array of the device of FIG. 1.

Referring also to FIG. 2, each sense element 12 of the array comprises a sense electrode 14 connected to a three terminal switching device 16 in the form of an n-type field effect transistor (FET) responsible for the sensing operation of the element. The X-Y array of sense elements is addressed via a first set of regularly-spaced row (selection) address conductors 18 and a second set of regularly-spaced column (sensing) address conductors 20 with individual sense elements being located at respective intersections of the two sets of conductors. The FETs 16 of all sense elements in the same row are connected to a respective adjacent row conductor 18, e.g. the nth row conductor, and the FETs 16 of all sense elements in the same column are connected to a respective, common, column conductor 20. In this particular embodiment, each sense element includes a second n-type FET 17 which is connected to a succeeding row address conductor 18, i.e. the (n+1)th row address conductor associated with the FETs 16 of the next row of sense elements, and which is responsible for resetting periodically the potential of the gate of the FET 16 of the sense element. The row conductors 18 are connected at their one ends to a row driver circuit 22, comprising a shift register circuit, and the column conductors 20 are connected at their one ends to a sense circuit, 24, having a sense amplifier 40 connected to each column conductor. The gate, source and drain terminals of the FET 16 of the sense element are connected respectively to the sense electrode 14, the column conductor 20 and the row conductor 18.

The gate terminal of the second FET 17 of each sense element in a row is connected to the other associated row conductor 18, i.e. the succeeding (n+1)th row conductor, and the source and drain terminals of this second FET 17 are connected respectively to the associated column conductor 20 and to the gate of the FET 16 (and the sense electrode 14). The gates of the first and second FETs 16 and 17 of each of the sense elements in the next row are connected respectively to the (n+1)th and (n+2)th row conductors 18, and so on.

The sense elements 12 and address conductors 18 and 20 of the pad 10 are fabricated using standard thin film technology, as used in active matrix addressed display devices for example, and as such it is not thought necessary to describe here the manner of their fabrication in detail. Briefly, it involves the deposition and definition by photolithographic processes of a number of layers on an insulating substrate. The electrodes 14 and sets of address conductors 18 and 20 can be formed of metal and the FETs 16 can be formed as amorphous silicon or polycrystalline silicon thin film transistors (TFTs) using an appropriate insulating substrate e.g. of glass, polymer, or quartz. While it is preferred to use thin film device technology, it will be appreciated that the sensing pad 10 could alternatively be fabricated using a semiconductor wafer and integrated circuit technology.

Figure 3:
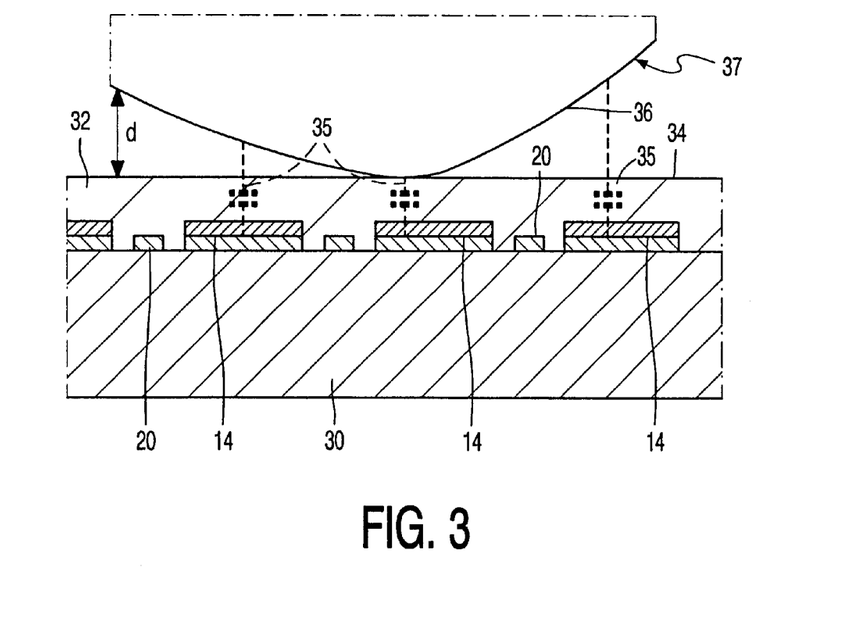
FIG. 3 is a cross-sectional view through a part of the sensing device illustrating the manner of its operation.
Figure 4:
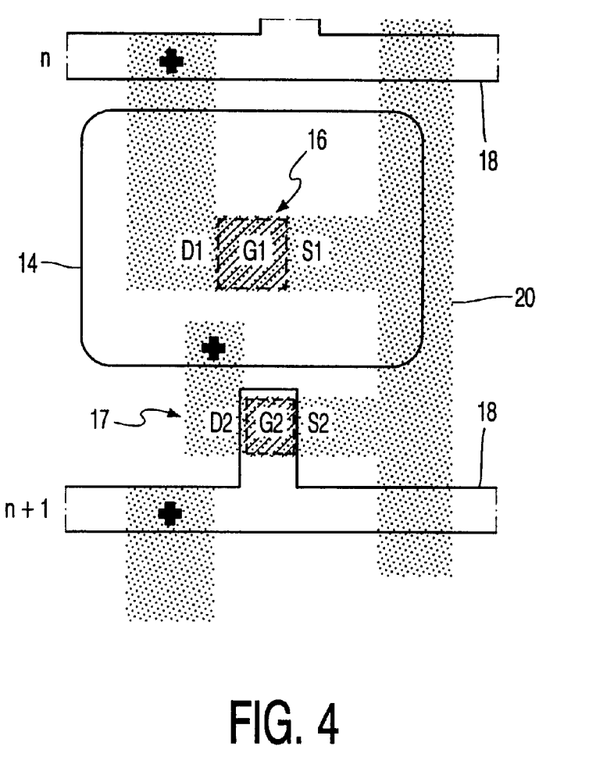
FIG. 4 is a plan schematic view of a typical sense element showing the lay-out of its components.

An example of one form of array construction is shown schematically and simplified in FIG. 3 which is a cross-section through a representative part of the pad 10 comprising three complete sense electrodes 14, and in FIG. 4 which is a plan view of a sense element showing the arrangement of its components. The TFT devices 16 and 17, which are not visible in the section of FIG. 3, are formed on an insulating substrate 30 from a deposited layer of amorphous or polycrystalline silicon material, constituting the TFTs' channels, with a deposited layer of dielectric material, for example silicon nitride or oxide, constituting the gate insulator layers of the TFTs. The sense electrodes 14, comprising regularly spaced and equally sized rectangular conductive pads, and the set of address conductor 18 extending therebetween, are defined from a deposited metal layer.

In FIG. 4, the gate, source and drain contacts of the TFTs 16 and 17 are designated G1, S1, D1 and G2, S2, D2 respectively. An integral extension of the row conductor 18 forms the gate contact G2 of TFT 17. Integral extensions of the column conductor 20, comprising for example n+type amorphous or polysilicon material, form the source contacts S1 and S2 of the TFTs 16 and 17. Other regions of the deposited n+type conductive form the drain contacts D1 and D2. Regions of intrinsic semiconductor material extending between the source and drain contacts D1, S1 and D2, S2 form the channels of the TFTs 16 and 17, denoted in dotted outline in FIG. 4, beneath the gate contacts G1 and G2. Extending over the source and drain contacts D1, S1, D2 and S2, the intrinsic channel regions, and the column conductor 20 there is an oxide layer constituting the gate insulator layer. The row conductors 18 and the sense electrode 14 are defined from a deposited metal layer, for example of chromium, with windows, denoted by crosses, in the underlying oxide layer being provided to allow contact between the nth row conductor and the underlying part of the drain contact D1 and between the sense electrode 14 and the underlying part of the drain contact D2. In this example, a part of the sense electrode 14 itself forms the gate of TFT 16. The sense electrode/gate occupies an area extending beyond the channel region of the TFT 16 and covers the regions of the drain and source contacts D1 and S1 leading from the channel region of the TFT 16 so as deliberately to increase the parasitic gate-source and gate-drain capacitances of the TFT 16.

To complete the structure of the sensing device, a hard dielectric film 32, for example of silicon nitride or diamond-like carbon, is deposited completely over the structure on the substrate 30 to provide a flat continuous sensing surface 34 spaced from, and substantially parallel to, the substrate surface, as shown in FIG. 3.

The physical dimensions of the sense electrodes 14 are their mutual spacing are chosen in accordance with the desired resolution characteristics for fingerprint sensing. By way of example, the sense electrodes may have a pitch of around 50 to 100 micrometres in both the row and column directions. The thickness of the insulating film 32 is selected taking into account the value of the relative permittivity of the material used for this film. For example, for a relative permittivity of approximately 4, a film, thickness of around 0.5 micrometres may be used.

In operation of this sensing device, a finger whose print is to be scanned is placed on the sensing surface 34. Actual, or close, physical contact with the surface 34 then occurs at the ridges of the fingerprint, as illustrated in FIG. 3 where one ridge of 36 of part of the finger surface 37 is depicted. Troughs in the fingerprint profile are spaced from the surface 34 by a considerably greater distance, around 50 $\mu$m. The ridged finger surface is therefore spaced from the array of electrodes 14 by a minimum distance determined by the thickness of the thin insulating film 32. Each sense electrode 14 and the respective overlying portion of the finger surface form opposing plates of a capacitor 35, as depicted by dotted lines in FIG. 3, with the upper plate, constituted by the finger surface portion, being effectively at ground potential. The intervening insulating film 32, and any air gap present between the finger surface portion and the sensing surface 34, provide the capacitor dielectric. The capacitances of these individual capacitors vary as a function of the spacing, d, between the fingerprint surface and the sensing surface 34, with larger capacitances occurring where the fingerprint ridges are in contact with surface 34 and smaller capacitances occurring where the troughs in the fingerprint overlie the sense electrodes 14. The variation in capacitances produced over the array of sensing elements 12 of the pad 10 by a fingerprint ridge pattern thus constitutes in effect an electronic "image" of the profile of the fingerprint surface. These capacitances are sensed within the sensing device and an output provided accordingly.

Figure 5:
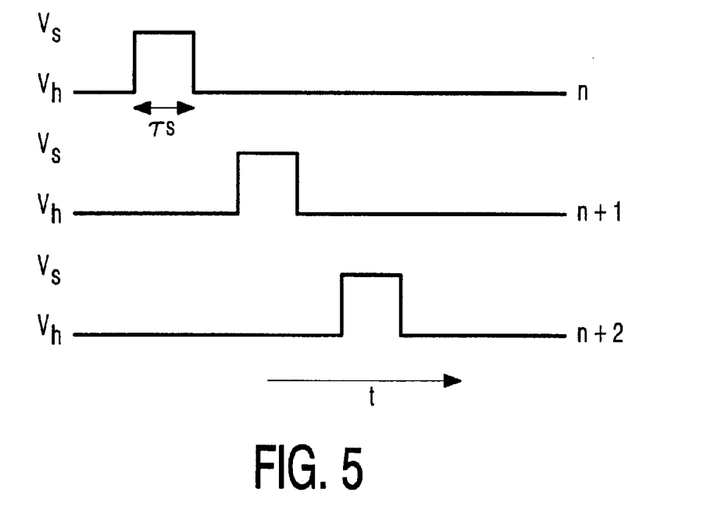
FIG. 5 illustrates example drive waveforms used in operation of the device.

Sensing the capacitance of the individual sense elements 12 in the array is accomplished as follows. Each sense element is addressed through its associated row, selection, and column sensing, conductors 18 and 20. The row driver circuit 22 is arranged to provide a selection signal in the form of a voltage pulse to each row address conductor 18, one at a time in turn, and so each row conductor, starting at row 1, receives a selection signal in sequence. An example of the timing relationship of the drive waveforms applied to three successive row conductors, n to n+2, is shown in FIG. 5.

Figure 6:
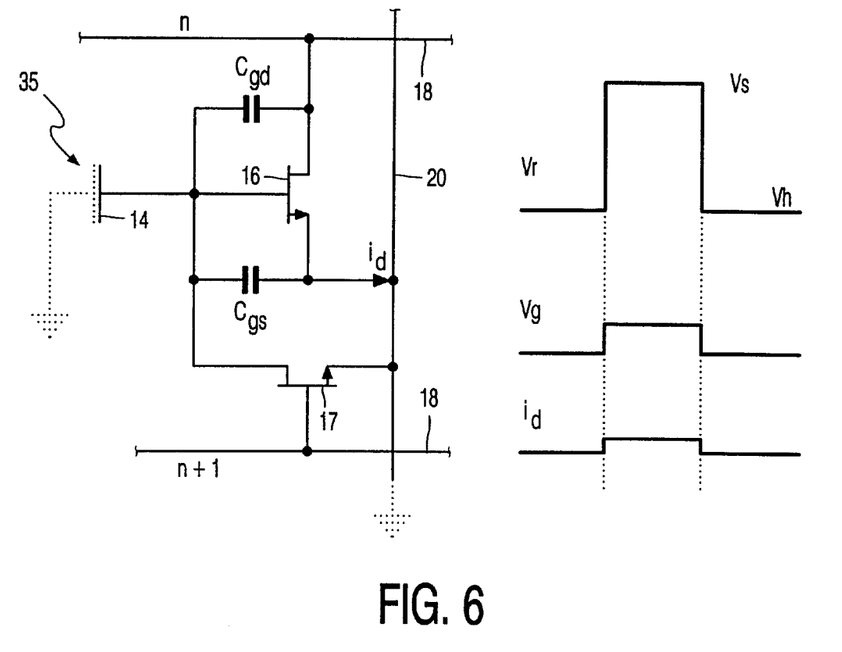
FIGS. 6 and 7 illustrate equivalent circuits of a sense element and the manner of its operation in sensing different parts of a fingerprint together with associated waveforms present in such operation.

The manner in which a sense element operates differs according to whether a fingerprint ridge or valley overlies its sense electrode. FIG. 6 illustrates the equivalent circuit of a sense element when a ridge is touching the surface 34 above the sense element and associated waveforms present during its operation. The lateral conduction through the ridge constitutes a conducting top plate of the sense element capacitance 35, as shown in dotted outline in FIG. 6. This top plate is effectively held at an ac ground potential since the bulk capacitance of the human body to ground is much larger than the sense element capacitance.

When the potential, Vr, on the $n^{th}$ row conductor 18 changes from a hold level, $V_h$ to the select level, $V_s$, upon the application of a selection pulse signal to the row conductor from the row drive circuit 22 the potential at the drain terminal of TFT 16 rises and charge is coupled onto the gate electrode via the TFT's parasitic gate-drain and gate-source capacitances, Cgd and Cgs. In simple terms, the change in the gate potential, $\Delta V_g$, can be expressed as:

$$\Delta V_g = \Delta V_r \times \frac{Cgd}{Cp + Cgd + Cgs}$$

where Cp is the capacitance 35 and $\Delta V_r = V_s - V_h$. The parasitic capacitances of the TFT 17 are here assumed to be significantly smaller than those of TFT 16 and, therefore, can be neglected. During this time TFT 17 is held off by the a hold potential level, $V_h$, applied to the (n+1)th row conductor.

By way of example, if the change in row conductor potential level $\Delta V_r$ is around 10V, the capacitance 35 is around 1 pF and Cgd and Cgs are both approximately equal to 20 fF, then $\Delta V_g$ will equal approximately 200 mV. The threshold voltage, $V_t$, of the TFT 16 is typically around 4V and so the resulting gate voltage change $\Delta V_g$ is too small to turn on the TFT 16. The drain current Id which then flows through the TFT 16 is only a very small leakage current, which typically would be in the order of $10^{-12}$A. This current flows through the column conductor 20 to the read-out sense amplifier 40 in the sense circuit 24 where it is integrated by the amplifier to produce an output voltage, Vo, which is approximately equal to $(Id.t_o)/C_F$ where $t_o$ is the amplifier integration period and $C_F$ is the amplifier feedback capacitance.

If $C_F$ is made equal approximately to 4 pF and an integration period of 1 µs is selected an output voltage Vo around 0.25 µV is obtained which is considerably less than the value of 1 LSB (4 mV) in an 8 bit read-out system.

Considering the case now of a fingerprint valley overlying the sense element then the sense element's capacitance will be significantly smaller (Cp being approximately equal to 0.5. $10^{-15}$F) and the parasitic capacitances will have the dominant effect. This situation is illustrated in the equivalent circuit diagram of FIG. 7 in which the capacitance 35, being insignificant, has been omitted. The increased overlap between the gate and the drain and source contacts of the TFT 16 assist in achieving this result. Such an effect can easily be arranged by increasing the overlap so that Cgd (and Cgs) equals K. Cp where K is greater than 10. In this case the rise in the gate potential, $\Delta V_g$, when a selection signal pulse is applied to the row conductor 18 will be approximately equal to $\Delta V_r$. Cgd/(Cgd+Cgs). Assuming Cgd is approximately the same as Cgs, then $\Delta V_g$ becomes approximately equal to $\Delta V_r/2$.

Figure 7:
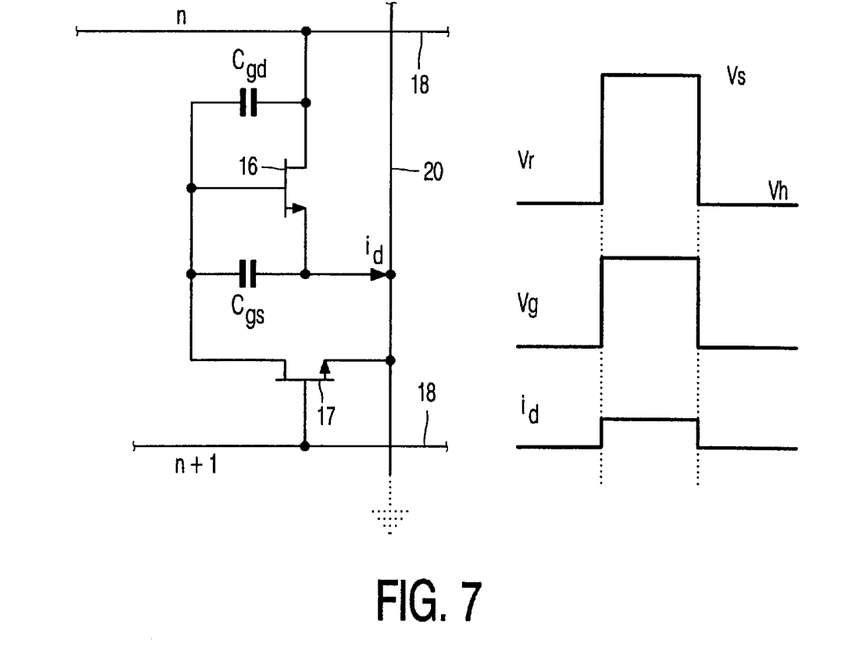

If $\Delta V_r$ equals 10V, as before, then the gate potential $V_g$ of TFT 16 will rise to approximately 5V. This is greater than the TFT's threshold voltage (4V) and sufficient to turn on the TFT. Consequently, a significant current, typically a few micro amps, will flow into the column conductor 20. If this current Id equals approximately 5 µA, then the output voltage Vo obtained from the read-out amplifier will be 1.25 V, assuming the same integration period and feedback capacitance value as before.

Of course, in the above example it has been assumed that Cgd and Cgs have roughly the same value. The ratio of those parasitic capacitances could be varied so that Cgd is larger whereby the potential on the gate of the TFT is further increased. This may be accomplished by re-arranging the sense electrode 14 such that it still overlaps the drain contact D1 of TFT 16 but does not significantly overlap the source contact S1 (FIG. 4). Rather than the gate electrode of the TFT 16 comprising a portion the sense electrode 14, the gate electrode and the sense electrode 14 may be formed separately and electrically interconnected.

It will be appreciated that the operation of the sense element 12 does not depend on a charge on the capacitance 35 being discharged through an FET into the column conductor and sensed by a read-out amplifier connected to that conductor as in the case of the device known from WO97/40744. Consequently the device of the present invention avoids the kind of problems found with the known device, namely that such discharging takes a considerably longer time, for example tens of microseconds, thereby slowing down the speed of reading, and also, importantly, the fact that ac noise from a person's finger is coupled into the read-out amplifier where it is integrated for this comparatively long period, thus corrupting the read-out voltage. In operation of the present device the TFT 16 drain current is sampled comparatively very quickly, in around one to 5 microseconds for example, which provides fast read-out and also much superior noise rejection because of the shorter integration period.

The ridge-valley ratio obtained is a function of the off/on current ratio of the TFT 16 which is many orders of magnitude and this provides a high contrast ratio.

During the reading operation of a sense element its TFT 17 remains inoperative. Due to the possibility of a build-up of static electricity on a touching person's finger the potential of the gate of the TFT 16 could perhaps float either high or low. This could result in the TFT 16 being held on, indicating the presence of a valley, or off, indicating the presence of a ridge. To prevent this false operation, the TFT 17 operates to maintain the steady state potential of the gate of the TFT 16 at 0V (virtual earth). A selection signal $V_s$ applied to the succeeding (n+1)th row conductor 18 for the purpose of selecting the next row of sense elements causes the TFTs 17 of the sense elements in the preceding row to turn on, thereby connecting the gate of the TFT 16, and the sense electrode 14, to its associated column conductor 20 and removing any charge on the gate and sense electrode. It might appear that as a consequence of this arrangement any charge which is stored on the sense element capacitance 35 is added to the output signal charge on the column conductor 20 produced when reading the next sense element in the column. However, to avoid this the sensing device could be arranged firstly to go through an initial resetting phase when a finger is placed over the array. This would entail pulsing all the row conductors 18 high momentarily so as to set the gate potentials of all the TFTs 16 to virtual earth. Then, when the sense elements are being operated there will be zero potential across the source and drain terminals of the TFTs 17.

Figure 8:
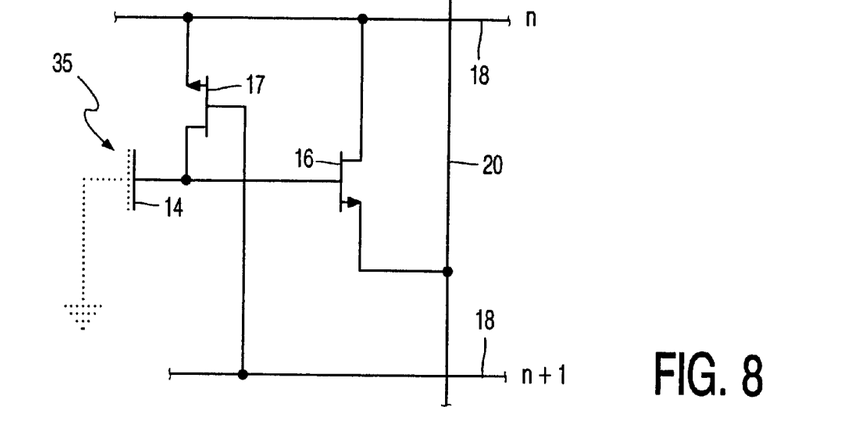
FIGS. 8 and 9 show equivalent circuits of two alternative forms of sense element.
Figure 9:
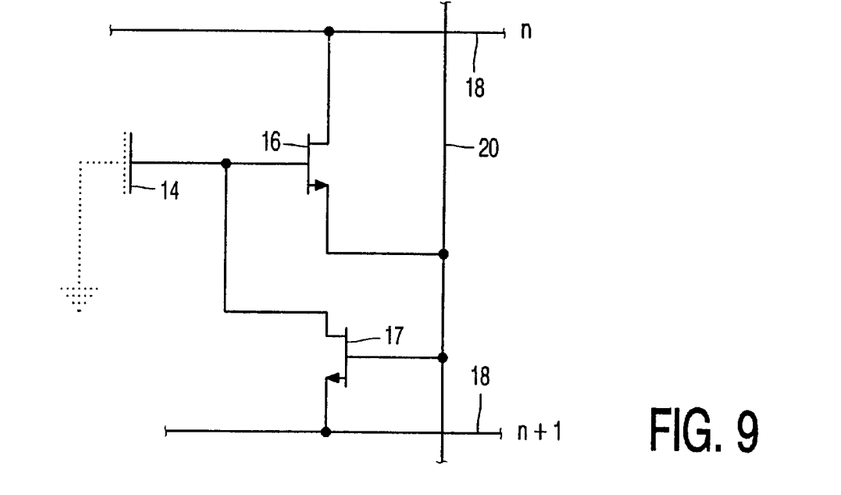

The TFTs 17 of the sense elements could be arranged differently, as shown in FIGS. 8 and 9. In the FIG. 8 arrangement, the source and drain terminals of the TFT 17 are connected between the gate of the TFT 16 and the $n^{th}$ row conductor 18 rather than the column conductor 20 so that when a selection signal is applied to the $(n+1)^{th}$ row conductor the TFT operates to pass any charge on the gate of the TFT 16 to the $n^{th}$ row conductor. In the FIG. 9 arrangement, the gate of the TFT 17 is connected to the column conductor 20 and its source and drain terminals connected to the (n+1)th row conductor 18 and the gate of the TFT 16. The basic reading operation of the sense elements remains the same as before. To reset the gate potential, however, the column conductors 20 are pulsed high at the beginning and/or end of a frame period to turn on the TFTs 17 of all the sense elements and hence reset the gates of the TFTs 16. As with the FIG. 8 arrangement, then any charge on the gate of a TFT 16 is passed to a row conductor rather than the column conductor.

The provision of a second TFT 17 is each of the sense elements is not essential. Problems due to static electricity on a person's finger can be avoided by alternative means. For example, grounded conductors of metal or ITO for example may be provided directly in the outer surface 34 of the insulator layer 32 (FIG. 3) overlying the spaces between adjacent rows and columns of sense elements either in the form of a grid or as a set of parallel strips, as described in U.S. Pat. No. 5,325,442.

A single selection signal applied to a row conductor 18 results in the sense elements associated with that row conductor performing a read operation. Each row of sense elements is addressed in this manner in a respective row address period by the sequential application of a selection signal to the set of row conductors 18 so as to scan the fingerprint and a complete "image" of the capacitance characteristics is built up following the addressing of all rows in the array in one complete field period. Typically, the duration of a selection signal Vs (Ts in FIG. 5) can be of around 1 to 5 microseconds. Around 50 frames per second may be possible, depending on the characteristics of the peripheral drive and sense circuitry.

In the column sense circuit 24 each column conductor 20 is connected to an associated charge amplifier 40 and the amplifiers are connected to a set of switches which are operated in succession by means of a shift register to provide on an output line a serial train of pulses whose magnitude is indicative of the charge flow in each column conductor 20, I to c, in turn with each row, I to r, of sense elements being read out in succession to provide an electronic representation of the ridge/valley pattern of a fingerprint in one field. For further details of this and alternative sense circuits reference is invited to the aforementioned WO97/40744.

The drive circuit of the device, comprising the row drive circuit 22 and the sensing circuit 24, may be integrated on the same substrate as that carrying the array of sense elements and fabricated simultaneously with the components of the sense elements thereby providing an inexpensive and compact sensing device. Such integration is conveniently achieved using polysilicon thin film technology. If low temperature polysilicon process technology is employed, the substrate can be of plastics material, and particularly a flexible polymer material. Such a sensing device can readily be incorporated in a smart card.

As previously mentioned, the sensing device may be fabricated as an integrated circuit using a semiconductor, e.g. silicon, wafer as the substrate rather than by thin film technology on an insulating substrate.

A matrix of discrete, electrically conductive pad electrodes may be provided on the surface of the insulating layer, each overlying and similar in size and shape to a sense electrode 14, to form the opposite plates of the capacitors 35. Ridges of a fingerprint ground particular ones of these pad electrodes where they are in contact and the capacitance of the capacitors 35 is then determined by the area of the sense electrodes 14 and their opposing pad electrodes and the thickness of the intervening insulating layer 32 so that substantially identical, and more distinctive, capacitances are obtained at all ridge contact locations. Elsewhere, surface portions of the finger are spaced from their underlying pad electrodes and the capacitance values are dependent on this spacing as before.

Figure 10:
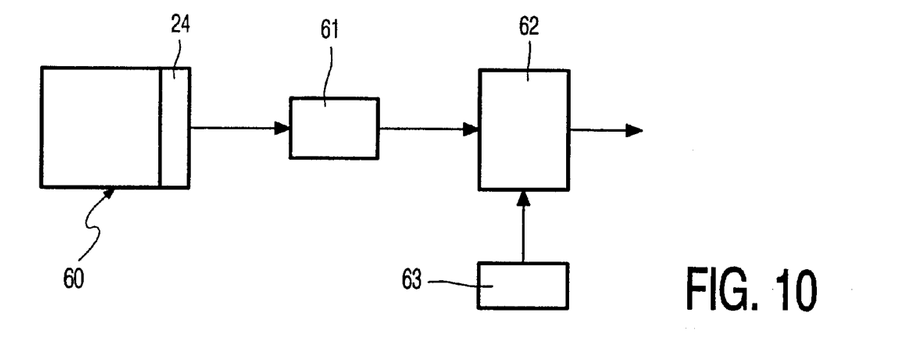
FIG. 10 illustrates in simple block diagram form a fingerprint recognition system using the sensing device.

FIG. 10 shows in schematic block form a fingerprint recognition system incorporating the sensing device, here represented by the block 60. The system includes means responsive to an output from the sensing circuit of the device to provide characteristical data of a sensed fingerprint, and means for comparing said characteristical data with stored characteristical data for one or more fingerprints. The output is in a form comparable to the video output provided by an image sensor in known optical fingerprint sensing devices and accordingly, as will be apparent to skilled persons, components of the system other than the sensing device can be generally of the kind employed in systems using optical sensing devices. The characteristical data, in accordance with standard practice, may take the form of information regarding the orientation of ridge lines and relative positions of minutiae, that is, the endings and bifurcations of the lines. The processing of information obtained from the sensing device to produce and compare characteristical data can follow known schemes and techniques. The output from the device 60, suitably conditioned, is fed to an analysis circuit 61 which is programmed to detect characterising features of the fingerprint sensed such as the position of minutiae. Data from the circuit 61 is supplied to a computer 62 which through standard algorithms compares the data with characteristical data of a plurality of fingerprints, or a single fingerprint depending on whether the system is used for identification or merely verification purposes, held in a storage device 63 and which provides an output in accordance with whether or not a match has been found. The circuit 61 can be programmed to utilise, with appropriate discrimination to select particular output signal values from the device 60, utilising specific information representative of the two dimensional ridge pattern in the nature of a binary image similar to that obtained from known optical sensing devices.

From reading the present disclosure, other modifications will be apparent to persons skilled in the art. Such modifications may involve other features which are already known in the field of fingerprint sensing devices and component parts thereof and which may be used instead of or in addition to features already described herein.

What is claimed is:

1. A fingerprint sensing device comprising an array of sense elements which each comprise a sense electrode spaced from a sensing surface over which a finger whose print is to be sensed is placed and providing in combination with an overlying fingerprint portion a capacitance, and a transistor connected between the sense electrode and first and second address conductors via which respectively the sense element is selected by means of a selection signal and an output dependent on the capacitance of the sense element is obtained, characterised in that the drain and source electrodes of the transistor are connected to the first and second address conductors and the gate electrode is coupled to the sense electrode.

2. A fingerprint sensing device according to claim 1, characterised in that the gate of the transistor is arranged to overlap substantially the electrode of the transistor connected to the first address conductor so as to increase the parasitic capacitance between the gate and that electrode.

3. A fingerprint sensing device according to claim 1, characterised in that the second address conductor is connected to a sense amplifier arranged to sample source/drain current of the transistor upon the application of a selection signal to the first address conductor.

4. A fingerprint sensing device according to claim 1, characterised in that the sense elements are arranged in rows and columns and connected to sets of first and second address conductors extending in the row and column directions, the transistors of the sense elements in a row being connected to a common address conductor of the first set and with the transistors of the sense elements in a column being connected to a common address conductor of the second set.

5. A fingerprint sensing device according to claim 4, characterised in that a drive circuit connected to the first set of address conductors is arranged to apply a selection signal to each address conductor of the set in turn to operate each row of sense elements in sequence.

6. A fingerprint sensing device according to claim 4, characterised in that each sense element includes a switching device which is connected to the gate of the transistor and operable selectively to set the potential of said gate to a predetermined level.

7. A fingerprint sensing device according to claim 6, characterised in that the switching device comprises a further transistor whose source and drain electrodes are connected between the gate of the first-mentioned transistor and either the second address conductor or the address conductor of the first set to which the first-mentioned transistor is connected and whose gate is connected to an address conductor of the first set different from that to which the first-mentioned transistor is connected.

8. A fingerprint sensing device according to claim 6, characterised in that the switching device comprises a further transistor whose source and drain electrodes are connected between the gate of the first-mentioned transistor and an address conductor of the first set different from that to which the first-mentioned transistor is connected, and whose gate is connected to the second address conductor.

9. A fingerprint sensing device according to claim 4, characterised in that grounded conductors are provided on the sensing surface for contacting a finger when placed on that surface.

10. A fingerprint sensing device according to claim 4, characterised in that the transistors of the sense elements comprise thin film transistors which are carried together with the sets of address conductors on a common insulating support.

11. A fingerprint sensing device according to claim 4, characterised in that the array of sense elements is fabricated as an integrated circuit on a semiconductor substrate.

12. A fingerprint recognition system comprising a fingerprint sensing device according to claim 1, means responsive to the outputs from the sense elements to provide characteristical data of a sensed fingerprint, and means for comparing said characteristical data with stored characteristical data for one or more fingerprints.

* * * * *